UNITED STATES PATENT OFFICE.

SAMUEL SCHWEITZER, OF CHICAGO, ILLINOIS.

POWDER FOR PASTE.

SPECIFICATION forming part of Letters Patent No. 640,819, dated January 9, 1900.

Application filed June 14, 1899. Serial No. 720,559. (No specimens.)

*To all whom it may concern:*

Be it known that I, SAMUEL SCHWEITZER, a citizen of the United States, residing in the city of Chicago, county of Cook, and State of Illinois, have invented a new and useful Powder for Paste, the same being an article of manufacture to be used in paste-making, of which the following is a specification.

My powder consists of glutinous cereal flour mixed with preservatives, and the same may be made of the following-named ingredients in the proportions following: Flour, (preferably of wheat,) one hundred pounds; mercuric chlorid, one pound; oil of cloves, two pounds.

The above-named ingredients may be conveniently mixed in the following manner: The flour is first passed in a thoroughly-dry state through a fine sieve or coarse bolting-cloth to free it from compact masses and is then placed in a receptacle having therein rotating helical mixers so arranged as to move portions of the flour in opposing directions at the same time and impart complete internal and external commotion to the entire mass. The preservatives in a thoroughly-dry pulverized state are then bolted through a fine-mesh bolting-cloth onto the heaving mass of flour. The addition of the preservatives is thus very gradual, and the process is continued until every particle of the flour is brought into contact with said preservatives. The resulting mixture is substantially non-fermentive, herein possessing an advantage over the flour commonly used for paste.

The presence of the preservatives lessens the bonding tendency or mechanical affinity of the particles of flour, for, the flour having been thoroughly dried and also every particle thereof having been brought into contact with said preservatives, said powder is non-cohesive and will not cake or form into compact masses under ordinary pressure in packing, thus obviating the resieving usually necessary when flour is used for paste.

The dry paste-flour when thus prepared is readily made into paste simply by thoroughly mixing the same with cold water and boiling the mixture. This requires little or no skill or care on the part of the operator.

In the methods of paste-making heretofore employed a batter is formed by mixing flour and cold water, and the preservatives are added either before or during the boiling or cooking process; but if the batter is cold the tendency is for the preservatives either to form a precipitate or to float upon the mixture, and if the batter is boiling or being cooked said batter quickly becomes too thick to become thoroughly mixed, and although skill and mechanical means are employed to aid the process it is practically impossible to obtain a paste which is homogeneous and uniformly impregnated with the preservatives. As a result there are frequently portions of the paste thus made which are so lacking in the proper proportionate amount of preservatives that such portions soon ferment. When a portion of the paste contained in a receptacle ferments, it usually renders unfit for use the entire quantity contained therein, both because it is difficult to separate the good from the bad portions and also because the fermented portions seem to induce fermentation in portions of the paste containing the preservatives in quantities which would under normal conditions be excessive. By the method of mixing the flour, water, and preservatives simultaneously either before or during boiling it is practically impossible to obtain a paste which will not ferment; but when my said powder is employed ordinary lack of skill or carelessness cannot affect the non-fermentive properties of the paste.

As my powder is non-cohesive, great care is not necessary to obtain smooth paste therefrom, and the time required for making is much less than that required by the old method. By employing my powder one person is enabled in eight or nine minutes to make one hundred and fifty pounds of paste, including the introduction of said powder into the receptacle, the mixing with the water, and the boiling of the mixture.

As the ingredients of my powder are thoroughly mixed before the water is added, the paste made therefrom will remain unfermented indefinitely.

A very important advantage of my powder over ordinary fluid or wet paste is that all the necessary ingredients for paste may be shipped without shipping water therewith. The thick paste of commerce contains eighty per cent. or more of water. One barrel of my powder contains the ingredients of five barrels of thick wet paste and therefore saves about eighty per cent. of the cost of transporting wet paste. Paste-users located distantly from paste-manufacturers are by reason of the great cost of transporting wet paste virtually prohibited from using ready-made paste and frequently on that account employ home-made pastes of inferior quality.

As the cost of transporting my powder for paste is no more than the cost of transporting flour and preservatives in separate forms, my invention enables paste-users remote from paste-manufacturers to manufacture their own paste and at the same time avail themselves of the experience, skill, and superior facilities of paste-manufacturers without increased cost of transportation.

It is well known that a fluid possessing some adhesiveness may be formed by mixing flour and cold water together, but that such mixture soon loses its homogeneity and adhesiveness and is subject to rapid fermentation, and in this connection a peculiar property of my powder for paste may be mentioned. When my said powder is mixed with cold water, the adhesiveness of the resulting fluid is less than the adhesiveness of the fluid formed by the mixture of flour and cold water; but after boiling the adhesiveness of the paste formed from my said powder is greater than the adhesiveness of the paste formed by boiling the mixture of flour and water.

My powder is distinct from that class of substances which may be called "dry pastes." Such dry pastes are prepared by mixing flour, water, and preservatives and boiling the mixture and afterward drying the paste thus formed and pulverizing it. Such dry compositions are true pastes in a dry form and upon the simple addition of or solution in water regain and possess their permanent, adhesive, and non-fermentative properties to as great an extent as they possessed previous to desiccation; but such pastes are liable to the same disadvantages as other pastes prepared by the wet process, in that as soon as mixed with water they are subject to fermentation on account of the necessarily imperfect mixture of the ingredients. Moreover, two operations necessary to the production of dry paste—namely, the addition and ultimate extraction of water—are eliminated in the production of my said powder, and the cost of production is thereby correspondingly reduced.

It is to be understood that I do not restrict myself either to the above-described ingredients or method of production of my powder, the novel feature of my invention being that the proper ingredients of said powder are thoroughly mixed dry in such a manner that each and every particle of the flour which forms the basis of the paste is brought into contact with the powdered preservative, thus forming a mixture which when put upon the market is an absolutely dry powder which may be easily made into paste by an unskilled person by simply adding water thereto and boiling the mixture.

It will be understood that the powder described above is free from digestants or converting agents, for the preservative agents with which the flour is compounded in making my powder are not acid and do not have a digesting or converting action on the flour, as is the case where an acid is used—as, for example, in the production of dextrine solutions from starchy flour—and said preservative agent being substantially neutral the adhesive obtained by mixing water with said powder and boiling the resulting mixture is quite distinct from those adhesives having dextrine as a basis and in which the presence of a converting agent or digestant is essential.

What I claim as new, and desire to secure by Letters Patent, is—

1. As a new article of manufacture, a powder for making adhesive flour paste which is free from a digestant or converting agent, said powder consisting of glutinous flour having mixed therewith, in dry condition, a preservative agent in sufficient quantities to prevent fermentation in paste made from said powder.

2. As a new article of manufacture, a non-fermentative, homogeneous powder for making adhesive flour paste which is free from a digestant or converting agent, said powder consisting of glutinous flour having mixed therewith, in dry condition, a neutral preservative agent in sufficient quantities to prevent fermentation in paste made from said powder, said preservative agent having no converting action upon said flour.

3. As a new article of manufacture, a powder for making adhesive flour paste which is free from a digestant or converting agent, said powder consisting of glutinous flour having mixed therewith, in dry condition, a neutral germicidal agent in sufficient quantities to prevent fermentation when said powder is mixed with water and boiled to produce paste.

4. As a new article of manufacture, a powder for making adhesive flour paste which is free from a digestant or converting agent, said powder consisting of glutinous cereal flour impregnated with a neutral preservative agent in sufficient quantities to render said powder non-cohesive in its dry condition and to prevent fermentation when said powder is mixed with water and boiled to produce paste.

SAMUEL SCHWEITZER.

Witnesses:
SIGMUND S. JONAS,
HOWARD M. COX.